3,217,047
RECOVERY PROCESS

Malcolm Korach and James L. Guthrie, Corpus Christi, Tex., assignors to Pittsburgh Plate Glass Company, Pittsburgh, Pa., a corporation of Pennsylvania
No Drawing. Filed Mar. 28, 1961, Ser. No. 98,771
7 Claims. (Cl. 260—633)

This invention relates to the separation of halohydrins from aqueous solutions. In particular, this invention is concerned with the separation of halohydrins from aqueous solutions by extraction with $C_4$ to $C_{20}$ carboxylic acids.

Halohydrins, as manufactured by the chlorination of olefins and haloolefins in aqueous medium, are desirably obtained as a dilute aqueous solution, in the order of 2 to 10 percent by weight of solution. As a general rule, when the solution of halohydrin as produced is even more dilute, improved yields result from the reaction. For example, glycerol dichlorohydrin, manufactured by the hypochlorination of allyl chloride, can be produced in commercially satisfactory yields when obtained as an aqueous 2–4 percent dichlorohydrin solution, basis weight of solution. Best yields of this halohydrin are obtained when it is held below 2 to 3 percent by weight of the aqueous solution.

The recovery of the dichlorohydrin from such a dilute mixture offers certain problems. While the mixture may be fractionated, this is expensive. Discovery of solvents which can be used effectively to recover the dichlorohydrin from the aqueous medium is difficult for a number of reasons. In the first place, some solvents react with the chlorohydrin to form a contaminant in the aqueous or organic phase. Others are not readily separated from the chlorohydrin after the extraction has been effected. Still others are insufficiently stable, and many have poor distribution coefficients. Many potential solvents are found to have either an undesirably high solubility in water or require large amounts of solvent in order to achieve an effective extraction of the halohydrin from the water.

This invention provides a method for the extraction of halohydrins from aqueous solutions using as extraction solvents, $C_4$ to $C_{20}$ aliphatic carboxylic acids having molecular weights of at least 116. More particularly, this invention provides for the extraction of glycerol dichlorohydrin isomers (1,3- and 2,3-glycerol dichlorohydrin) from dilute aqueous solutions containing small quantities of HCl (up to 2.5 percent by weight of the solution) using the above aliphatic acids as extraction solvents. The extraction process of this invention can be conveniently carried out in a batchwise or continuous manner.

Specific examples of carboxylic acids within the scope of this invention are heptanoic acid, caprylic acid, pelargonic acid, capric acid, undecanoic acid, alpha-chlorobutyric acid, alpha,beta-dichlorobutyric acid, lauric acid, stearic acid, stearoxylic acid, oleic acid, perfluorooctanoic acid, linoleic acid, linolenic acid, eleostearic acid, licanic acid, myristic acid, myristoleic acid, palmitic acid, palmitoleic acid, and ricinoleic acid. In addition thereto, fatty acid mixtures from hydrolyzed glycerides are usable and include the hydrolyzed vegetable and marine fish oils, e.g., castor oil, coconut oil, corn oil, cottonseed oil, linseed oil, oiticica oil, perilla oil, poppyseed oil, rapeseed oil, safflower oil, soybean oil, sunflower oil, tall oil, tung oil, cod liver oil and herring oil.

The $C_4$ to $C_{20}$ aliphatic monocarboxylic acids of this invention have molecular weights in excess of 116. Included within the terms of the above are anhydrides of the above-listed acids, mixtures of the anhydrides and monocarboxylic acids, substituted aliphatic monocarboxylic acids, such as, alcoholic hydroxy aliphatic monocarboxylic acids, alpha to omega halogen substituted aliphatic monocarboxylic acids (e.g., alpha,beta-dibromobutyric acid or perfluorooctanoic acid), alkyl substituted aliphatic acid (e.g., alpha-ethyl-alpha-methyl-butyric acid or 2-ethyl-hexanoic acid), etc., and their corresponding anhydrides. The acids within the terms of this invention are substantially water-insoluble. That is to say, its water solubility should not exceed 2 percent by weight, basis weight of water, at 20° C. Preferably, the water solubility of the acids should not exceed 1.5 percent by weight at 20° C. and, as a general rule, does not exceed 0.5 percent by weight at 20° C.

This invention may be conveniently carried out by utilizing conventional extraction methods. Thus the solvent of this invention can be added to the dilute aqueous halohydrin solution and the solution shaken to effect intimate contact between the halohydrin solution and the added solvent. Upon standing, a pair of immiscible phases separate, one phase comprising predominately the water immiscible carboxylic acid solvent containing the halohydrin and the other being mainly water. These two phases can be phase separated by conventional means. If the selected solvent is a $C_{18}$ fatty acid, then the aqueous solutions may be added to the fatty acid. The resulting halohydrin-containing fatty acid layer formed at the top is then separated from the lower water layer by conventional means. The countercurrent extraction method can also be effectively used. In this method, the solution having the higher specific gravity is introduced through the top of a tower, e.g., a Scheivel tower, using the technique described in "Industrial and Engineering Chemistry," vol. 42, page 1048, June 1950, and the other solution is introduced through the bottom of the same tower. For example, aqueous glycerol dichlorohydrin solution is added to the top of a tower, and the fatty acid is pumped into the bottom of the same tower. The fatty acid containing the glycerol dichlorohydrin is withdrawn from the top of the tower and the aqueous raffinate drawn off from the bottom. This method can be conveniently effected in a continuous manner.

As a general rule, the selection of $C_4$ to $C_{20}$ fatty acids of this invention, which includes their anhydrides, depends in some measure on the boiling point of the halohydrin to be extracted. Those acids having boiling points more than 100° C. higher than, e.g., the isomers of glycerol dichlorohydrin (1,3-dichloro-2-propanol and 2,3-dichloro-1-propanol) are found most desirable for extracting these isomers. Hence, separation of glycerol dichlorohydrin from the fatty acid is readily facilitated by conventional distillation techniques. It is preferred that the extraction solvent have a boiling point at least 20° higher or lower than that of the extracted halohydrin. Since other impurities tend to be present, viz., trichloropropane, in the extracted solution, fractional distillation will as a general rule effectively separate them from the glycerol dichlorohydrin end product. The recovered selected solvent may then be used for further extraction. The recovered glycerol dichlorohydrin can then be employed in the manufacture of glycerol by known methods of hydrolysis.

The following examples illustrate the manner in which representative aqueous solutions of halohydrin may be treated to extract the halohydrin from the solution by employing as extraction solvents, the above class of carboxylic acids. The operating temperature in the following examples was 25° C. unless otherwise indicated.

EXAMPLE I

Twenty-one liters of an aqueous glycerol dichlorohydrin solution containing 810 grams of glycerol dichlorohydrin was divided into seven 3 liter portions. Seven hundred fifty grams of sodium chloride was added to each 3 liter portion. Each portion was extracted with oleic acid by mixing the portion with 257 milliliters of oleic acid in a separatory funnel and shaking one minute. Upon standing, each of the extracted portions separated into two phases—an upper oleic acid-dichlorohydrin phase and a lower aqueous phase. The various layers were separated and the seven oleic acid-dichlorohydrin layers were combined. Added to this combined extract was approximately 300 grams of oleic acid, previously employed for dichlorohydrin extraction, and which contained an undetermined amount of dichlorohydrin. This combined extract was distilled at 1 millimeter (mercury) pressure with a 12-inch Vigreux column, allowing the pot temperature to rise to 140° C. The maximum head temperature of the column was 50° C.

The recovered oleic acid was divided into seven portions, and each was mixed with each of the separated aqueous layers obtained above. Each of the mixtures was shaken for one minute in a separatory funnel and left standing until two layers were formed. The oleic acid layers were combined and distilled in the same manner stated above.

This same extraction-distillation procedure was repeated two more times and in each case the recovered oleic acid was mixed with the aqueous layers obtained from the preceding extraction.

After carrying out the extraction-distillation procedure four times, 808 grams of distillate was accumulated and it contained a small aqueous layer. After removing the aqueous layer and incompletely drying over 100 grams of anhydrous calcium sulfate, the resulting 760 grams of distillate was found to have the following analysis:

*Table*

| Component | Weight percent | Weight percent on anhydrous basis calculated average |
|---|---|---|
| 1,3-glycerol dichlorohydrin | 31.0 (31.0) | 33.7 |
| 2,3-glycerol dichlorohydrin | 56.5 (58.5) | 62.6 |
| 1,2,3-trichloropropane | 3.0 (3.4) | 3.4 |
| Unknown | 0.3 (0.2) | 0.3 |
| Water | 9.3 (7.0) | |

The weight percents in parenthesis as set forth in the above table represent a re-analysis of the dried distillate after it became pale green on standing for a few days and was decolorized by heating for a few minutes with 1 percent by weight of activated charcoal.

EXAMPLE II

Four 400 milliliter portions of an aqueous solution containing 3.7 percent glycerol dichlorohydrin and 1 percent HCl, basis weight of solution, were each placed in separatory funnels with 0, 20, 40 and 100 grams of sodium chloride, respectively. The solutions were shaken until all of the salt dissolved and 50 milliliter samples were withdrawn for analysis. One hundred milliliters of distilled tall oil (Acintol D, Arizona Chemical Company) was added to each funnel and the funnels shaken for one minute. On standing overnight, the two layers were formed—a water layer and a tall oil-dichlorohydrin layer. The layers were separately withdrawn and 100 cubic centimeters of each layer was poured into a 100 cubic centimeter graduated cylinder and weighed, in order to determine the density of each layer. The resulting eight samples were then analyzed for ionic chloride by the standard Volhard chloride analysis, and for total hydrolyzable chloride by hydrolysis with alcoholic alkali, e.g., sodium ethanolate.

The distribution coefficients were calculated for each salt concentration by the following equation:

Distribution coefficient=

$$\frac{\text{(Weight percent organic Cl in tall oil) (density of tall oil layer)}}{\text{(Weight percent organic Cl in aqueous) (density of aqueous layer)}}$$

where weight percent organic Cl is the difference between the total hydrolyzable chloride and the ionic chloride percentages.

The following distribution coefficients were obtained:

| Samples | Amount of salt added, grams | Distribution coefficients |
|---|---|---|
| 1 | 0 | 1.3 |
| 2 | 20 | 1.4 |
| 3 | 40 | 2.0 |
| 4 | 100 | 3.7 |

EXAMPLE III

The above experiment was repeated except that tall oil fatty acids (Acintol FA-1, Arizona Chemical Company) were substituted in the same amounts for tall oil. The distribution coefficients obtained follow:

| Samples | Amount of salt added, grams | Distribution coefficients |
|---|---|---|
| 1 | 0 | 1.4 |
| 2 | 20 | 1.9 |
| 3 | 40 | 2.2 |
| 4 | 100 | 3.8 |

EXAMPLE IV

The procedure of Example II was repeated except that USP oleic acid was substituted in equal amounts for the tall oil and salt concentrations of 50 and 250 grams per liter were employed.

The following distribution coefficients were obtained:

| Samples | Amount of salt added, grams/liter | Distribution coefficients |
|---|---|---|
| 1 | 0 | 1.3 |
| 2 | 50 | 2.0 |
| 3 | 250 | 4.8 |

EXAMPLE V

The procedure of Example II was repeated at salt concentrations of 0, 50, 150 and 250 grams per liter and the aqueous solution employed was a 1 percent solution of 1,3-glycerol dichlorohydrin containing 1 percent HCl, basis weight of solution, prepared by mixing 100 milliliters of concentrated HCl and 40 grams of an aqueous 93 percent 1,3-glycerol dichlorohydrin solution, basis weight of solution, in 3 liters of water. This experiment served the purpose of detecting any radical effect of dilution or change in dichlorohydrin isomer ratio. The extraction solvent was the same tall oil fatty acids employed in Example III.

The distribution coefficients determined as set forth in the preceding examples were as follows:

| Samples | Salt concentration (grams per liter) | Distribution coefficients |
|---|---|---|
| 1 | 0 | 1.1 |
| 2 | 50 | 1.3 |
| 3 | 150 | 2.0 |
| 4 | 250 | 4.4 |

From these results, it is apparent that the ability of tall oil acids to extract the 1,3-dichlorohydrin isomer (1 percent) from a 1 percent HCl solution is not significantly different from its ability to extract a 3 percent isomer mixture containing largely the 2,3-isomer from a similar solution.

The following is a typical analysis of Acintol D:

| | |
|---|---|
| Color, Gardner | 8 |
| Acid number | 190 |
| Saponification number | 193 |
| Iodine number | 164 |
| Rosin acids, percent | 32.0 |
| Unsaponifiables, percent | 1.4 |
| Fatty acid, total percent | 66.6 |

Fatty acid composition:

| | |
|---|---|
| Linoleic acid, conjugated, percent | 9 |
| Linoleic acid, nonconjugated, percent | 37 |
| Oleic acid, percent | 51 |
| Saturated acids, percent | 3 |
| | 100 |

| | |
|---|---|
| Moisture, percent | None |
| Ash, percent | 0.01 |
| Viscosity, SSU 210° F | 54 |
| Viscosity, Gardner-Holt 25° C. | D |
| Specific gravity, 25/25° C. | 0.9465 |
| Weight per gallon, 25° C., lbs. | 7.90 |
| Flash point, open cup, ° F. | 400 |
| Fire point, open cup, ° F. | 435 |

The following is a typical analysis of Acintol FA-1, tall oil fatty acids:

| | |
|---|---|
| Color, Gardner | 9 |
| Titer, ° C. | 3 |
| Acid number | 189 |
| Saponification number | 192 |
| Iodine number | 138 |
| Rosin acids, percent | 3.5 |
| Unsaponifiables, percent | 4.0 |
| Total fatty acid, percent | 92.5 |

Fatty acid composition:

| | |
|---|---|
| Linoleic acid, percent | 46.0 |
| Oleic acid, percent | 51.0 |
| Saturated acid, percent | 3.0 |
| | 100.0 |

| | |
|---|---|
| Moisture | None |
| Ash, percent | 0.005 |
| Viscosity, SSU 100° F. | 93 |
| Viscosity, Gardner-Holt, 25° C. | A |
| Specific gravity, 25/25° C. | 0.9005 |
| Weight per gallon, 25° C., lbs. | 7.515 |
| Flash point, open cup, ° F. | 380 |
| Fire point, open cup, ° F. | 415 |

All percents are by weight, basis total composition.

EXAMPLE VI

The procedure of Example V was repeated except that an aqueous glycerol dichlorohydrin solution made by mixing 114 grams of the same dichlorohydrin with 70 milliliters of HCl in 3 liters of water was used and linoleic acid was substituted for the tall oil fatty acids. The extractions were carried out using 300 milliliters of the aqueous solution and 50 milliliters of linoleic acid. The distribution coefficient was found to be 1.5 at zero NaCl concentration and 1.7 at 30 grams/liter NaCl concentration.

When the following acids were substituted for the linoleic acid in the above procedure, the following distribution coefficients were obtained:

| Solvent | No added NaCl | 30 grams/ liter of added NaCl |
|---|---|---|
| Pelargonic acid | 3.3 | 3.8 |
| Cyclohexane carboxylic acid | 5.3 | 6.8 |
| Caproic acid | 5.5 | 6.5 |

EXAMPLE VII

The procedure of Example VI was repeated at salt concentrations of 0 and 30 grams per liter and the aqueous solution was the same as that employed in Example V. Instead of 50 milliliters of solvent, the extraction was carried out with 100 milliliters of solvent. The solvent employed in this example was ricinoleic acid. The distribution coefficient obtained for 0 salt concentration was 3.1 and for 30 grams per liter was 4.0.

EXAMPLE VIII

A feed stream of an aqueous solution comprising 3 percent glycerol dichlorohydrin, 1 percent HCl, 0.3 percent trichloropropane (basis weight of solution), and containing added sodium chloride to give a salt concentration of 25 grams per liter, is continuously fed to the top of a packed extraction column. The column is 20 feet in height, 2 inches in diameter and contains therein perforated plates. The packing is porcelain saddles. The column is constructed of glass. To the bottom of the column is continuously added an oleic acid feed stream to effect countercurrent contact with the aqueous solution. The feed streams are introduced so that the volume ratio of aqueous solution to oleic acid is 1.5.

The aqueous raffinate drawn from the bottom of the column contains 1 percent HCl and, on the average, less than 0.06 percent glycerol dichlorohydrin, basis weight of solution. The oleic acid leaving the top of the column contains 4.5 percent glycerol dichlorohydrin, basis weight of solution, and the HCl content is free from detection.

The raffinate is sewered and the oleic acid-dichlorohydrin stream is fed to a steam distillation unit. At this point, more than 98 percent (basis weight of solution) of the glycerol dichlorohydrin is extracted into the oleic acid.

The stream is heated to 160° C. and fed near the top of a 30-plate distillation column. The column is six feet in height, one inch in diameter and constructed of glass. Steam at 160° C. is introduced in the bottom of the column at a rate of 5 moles for every mole of glycerol dichlorohydrin introduced, to countercurrently contact with oleic acid stream. The oleic acid leaving the bottom of the column contains on the average .06 percent by weight dichlorohydrin. This oleic acid is recycled to the extraction column so that very little of its glycerol dichlorohydrin is lost.

A two-phase distillate is obtained from the top of the distillation column and collected in a vessel. It consists only of water, glycerol dichlorohydrin, and a few parts per million of oleic acid. The lower phase of the two-phase distillate is 85 percent by weight glycerol dichlorohydrin and is 63 percent by weight of the distillate. The upper phase is 15 percent by weight glycerol dichlorohydrin and is 37 percent by weight of the distillate. Ninety-nine percent by weight of the glycerol dichlorohydrin in the oleic acid extraction stream has been stripped and 90.5 percent by weight of all the glycerol dichlorohydrin is in the lower organic distillate phase.

The aqueous upper distillate phase was collected for future hydrolysis of the dichlorohydrin to glycerol. Alternatively, it could be recycled to the extraction column and combined with the stream of aqueous solution at a rate so as to increase the dichlorohydrin content of the feed stream to 3.3 percent by weight, with the subsequent increase of the dichlorohydrin content in the oleic acid extraction stream to 5.0 percent by weight.

The 85 percent dichlorohydrin phase was dried and pure glycerol dichlorohydrin was obtained. Alternatively, the glycerol dichlorohydrin solution can be treated with, e.g., sodium carbonate, to hydrolyze the hydrin to glycerol.

The process herein contemplated is especially useful for the improvement of the yield of glycerol dichlorohydrin and like chlorohydrins. Thus it is known that such chlorohydrins can be prepared by reacting an olefin such as ethylene, propylene, butylene or the chloro derivatives thereof such as allyl chloride with chlorine in aqueous medium. Because of the problems entailed in recovery of the chlorohydrin or its corresponding epoxide this material normally is produced in concentrations of 3 to 6 percent or more by weight. Yields are rarely in excess of 90 percent of theoretical.

In the present process, it is possible to make and recover chlorohydrins in concentrations below 2 to 3 percent by weight simply by controlling the amount of water present during the reaction and extracting the resulting solution with a carboxylic acid of the type above described. By so doing it is possible to produce an extract the dichlorohydrin in amounts of 95 percent and more of theoretical. This constitutes an important economic advantage over other processes.

The following example is illustrative:

EXAMPLE IX

An aqueous solution of glyceroil dichlorohydrin was formed by circulating a stream of water in a cyclic path at a rate of 1.8 gallons per minute through a tower 25 inches long and 71 millimeters in diameter, withdrawing water from the top of the tower and feeding it into the bottom thereof while feeding liquid allyl chloride into the bottom of the tower at the rate of 2 cubic centimeters per minute and chlorine also at the bottom of the tower sufficient to supply about 2 percent excess chlorine, based upon the allyl chloride. The temperature of the tower was held at 50° C. After the concentration of glycerol chlorohydrin built up to about 1.83 percent, water was fed into the circulation system and the solution was continuously withdrawn, the chlorohydrin concentration being held at about 1.83 percent by weight. The yield of chlorohydrin was about 95.8 percent of theoretical based upon the allyl chloride.

A quantity of this aqueous solution is extracted as in Example III with tall oil fatty acids and the chlorohydrin is substantially completely extracted in the acid phase.

Though the above examples are specific as to the extraction of glycerol dichlorohydrin (composition of isomer mixture in all instances is substantially the same as that set forth in the table in Example I), the above solvents may be conveniently and efficiently employed in the same manner for the separation of other halohydrins from aqueous solutions, preferably, dilute aqueous solutions. The halohydrin of this invention should be capable of forming at least a 1 percent by weight halohydrin aqueous solution, basis weight of solution.

Thus, this invention may be employed to extract ethylene chlorohydrin, ethylene bromohydrin, ethylene iodohydrin, primary and secondary propylene chlorohydrin, primary and secondary propylene bromohydrin, primary and secondary propylene iodohydrin, 3-chloro-butanol-2, 1-chloro-2-methyl propanol-2, 2-chloro-2-methyl-propanol-1, alpha and/or beta-glycerol monochlorohydrin, 1,3-diiodo-2-propanol and 3-iodo-1,2-propandiol from aqueous solutions in any concentration but preferably from dilute aqueous solutions containing less than 10 percent, viz., 0.05 to 8 percent by weight of halohydrin. Thus, the halohydrins may contain one, two or more halogen groups per molecule; one, two or more hydroxyl groups per molecule and up to 4 carbon atoms.

In performing this invention, use of solvents having a boiling point at least 20° C. higher or lower than the boiling point of the halohydrin to be extracted offers substantial advantages. If the solvent employed has such a boiling point difference, separation by distillation of the halohydrin from the solvent is facilitated.

If the solvent, at normal temperature operating conditions, e.g., 25° C., is solid, viz., stearic acid, then the extraction may be carried out at a temperature slightly above the melting point of the acid. As a general rule, the solid acids or esters should melt below 100° C., though higher melting solvents may be employed by maintaining the extraction process under pressure. In the case of stearic acid, melting point 70–71° C., a temperature of 70 to 75°C. is convenient. The possibility of esterification resulting from the use of higher temperatures exists but offers no problem. The carboxylic acids listed above, when esterified, remain essentially water insoluble and also remain efficient extraction solvents for halohydrins. Any slight amount of esterification between the carboxylic acids of this invention and the halohydrins, e.g., glycerol dichlorohydrin, is generally beneficial to the process. Thus, an ester of glycerol-1,3- or 2,3-dichlorohydrin and stearic acid is superior as an extraction solvent for glycerol dichlorohydrin than stearic acid per se.

In accordance with a preferred embodiment of this invention, water-soluble metal halide salts, such as sodium chloride, are included in the aqueous halohydrin solution to be extracted. Examples II, III, IV, V, VI and VII illustrate the incorporation of NaCl in the aqueous halohydrin solution to favorably effectuate the distribution of halohydrin in the extract. In general, an increase in the salt concentration from 0 to 25 grams per liter in the aqueous phase increases by approximately 10 percent the halohydrin distribution coefficient value. As a general rule, 30 to 250 grams per liter of added salt raises the distribution coefficient to a level which materially enhances the process for large scale extraction, though completely saturated solutions can be employed. From an economic viewpoint, 30–100 grams per liter gives most satisfactory results. In addition, the presence of small amounts of salt increases the density of the aqueous layer resulting from contacting the solvent with the aqueous solution, so that, in the case of solvents with a specific gravity of less than one, the ease of phase separation is enhanced. Water-soluble salts that are usable in this invention are, for example, inorganic alkali metal and alkaline earth metal salts, for example, sodium chloride, potassium chloride, sodium sulfate, potassium sulfate, magnesium chloride, calcium chloride and magnesium sulfate.

The amount of the above extraction solvent employed, on a volume basis, for the treatment of the aqueous halohydrin solutions may be in the ratio (aqueous halohydrin solution to solvent, basis volume) of 0.01:1 to 10:1, preferably 0.5:1 to 5:1. This ratio may be modified if the concentration of halohydrin in the aqueous solution far exceeds 8 percent by weight.

Although the present invention has been described in detail as to particular embodiments thereof, it is not intended that these details shall limit the scope of the invention except insofar as included in the accompanying claims.

We claim:

1. The process of recovering glycerol dichlorohydrin from aqueous solution containing the same which comprises extracting the dichlorohydrin from said solution with a solvent selected from the group consisting of heptanoic acid, caprylic acid, pelargonic acid, capric acid, undecanoic acid, alpha-chlorobutyric acid, alpha,beta-dichlorobutyric acid, lauric acid, stearic acid, stearoxylic acid, oleic acid, perfluorooctanoic acid, linoleic acid, linolenic acid, eleostearic acid, licanic acid, myristic acid, myristoleic acid, palmitic acid, palmitoleic acid, ricinoleic acid, the anhydrides of said acids, and acids from hydrolyzed oils selected from the group consisting of castor oil, coconut oil, corn oil, cottonseed oil, linseed oil, oiticica oil, perilla oil, poppyseed oil, rapeseed oil, safflower oil, soybean oil, sunflower oil, tall oil, tung oil, cod liver oil and herring oil.

2. The process of claim 1 wherein said aqueous solution contains inorganic salt selected from the group consisting of alkali metal and alkaline earth metal salts.

3. The process of recovering glycerol dichlorohydrin from an aqueous solution containing .05–8 percent by weight of the same and up to 2.5 percent by weight HCl, wherein the dichlorohydrin is extracted from said solution by tall oil.

4. The process of recovering glycerol dichlorohydrin from an aqueous solution containing .05–8 percent by weight of the same and up to 2.5 percent by weight HCl, wherein the dichlorohydrin is extracted from said solution by oleic acid.

5. The process of recovering glycerol dichlorohydrin from an aqueous solution containing .05–8 percent by weight of the same and up to 2.5 percent by weight HCl, wherein the dichlorohydrin is extracted from said solution by tall oil fatty acids.

6. The process of recovering glycerol dichlorohydrin from an aqueous solution containing 0.5–8 percent by weight of the same and up to 2.5 percent by weight HCl, wherein the dichlorohydrin is extracted from the solution by linoleic acid.

7. The process of recovering glycerol dichlorohydrin from an aqueous solution containing .05–8 percent by weight of the same and up to 2.5 percent by weight HCl, wherein the dichlorohydrin is extracted from said solution by ricinoleic acid.

References Cited by the Examiner
UNITED STATES PATENTS

| | | | |
|---|---|---|---|
| 2,456,350 | 12/48 | Weizmann | 260—633 |
| 2,856,417 | 10/58 | Wijga | 260—634 X |

LEON ZITVER, *Primary Examiner.*